L. A. DARLING.
POWER GENERATOR.
APPLICATION FILED JUNE 24, 1916.
1,311,878.
Patented Aug. 5, 1919.
3 SHEETS—SHEET 1.
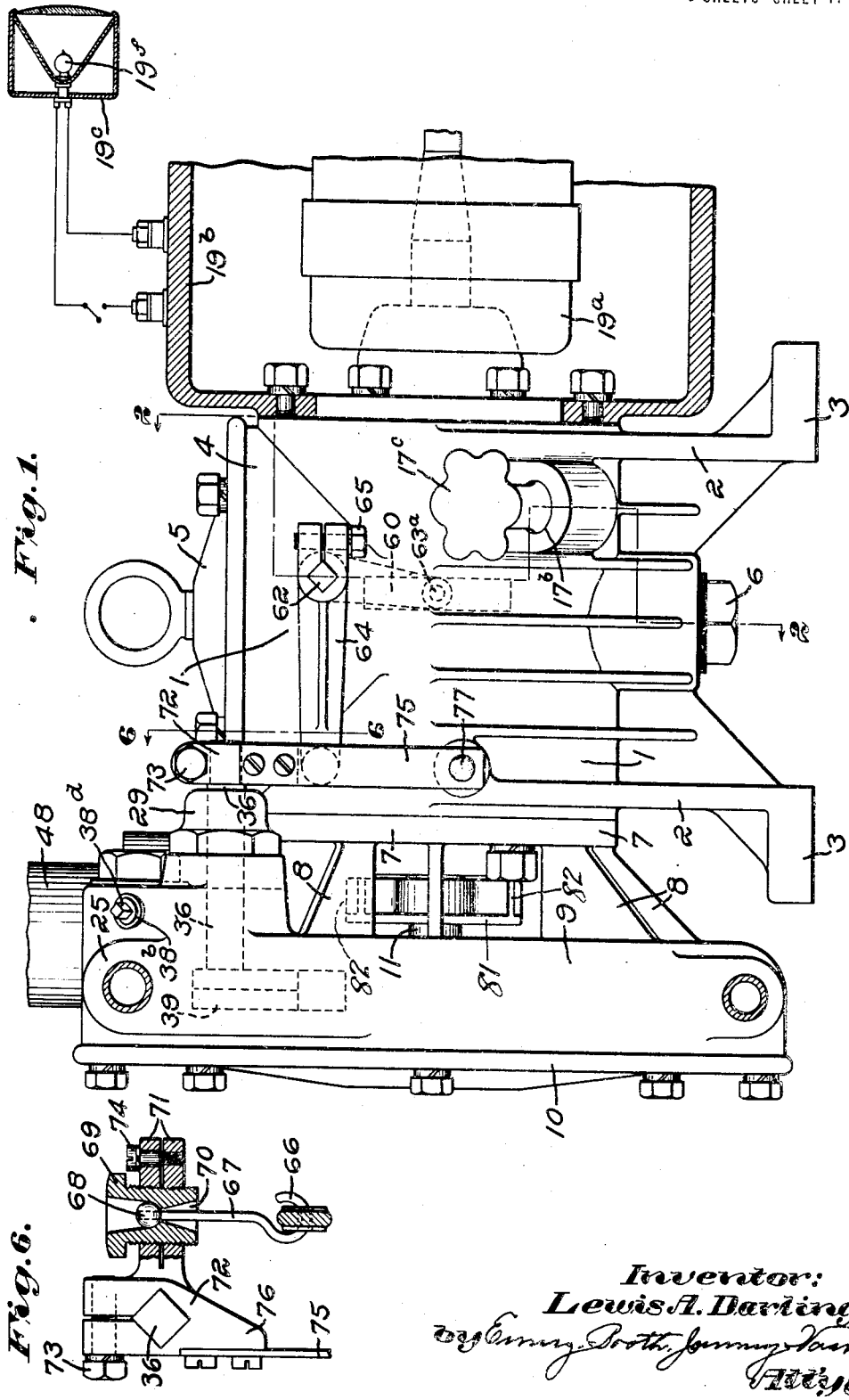
Inventor:
Lewis A. Darling, L. A. DARLING.
POWER GENERATOR.
APPLICATION FILED JUNE 24, 1916.
1,311,878.
Patented Aug. 5, 1919.
3 SHEETS—SHEET 2.
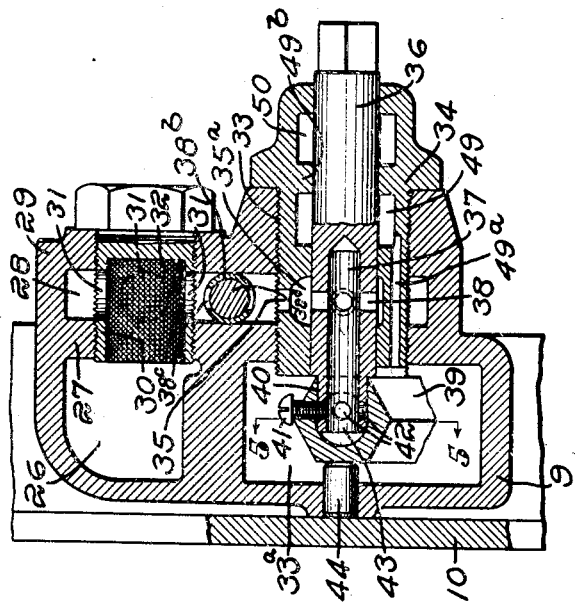
Inventor:
Lewis A. Darling,

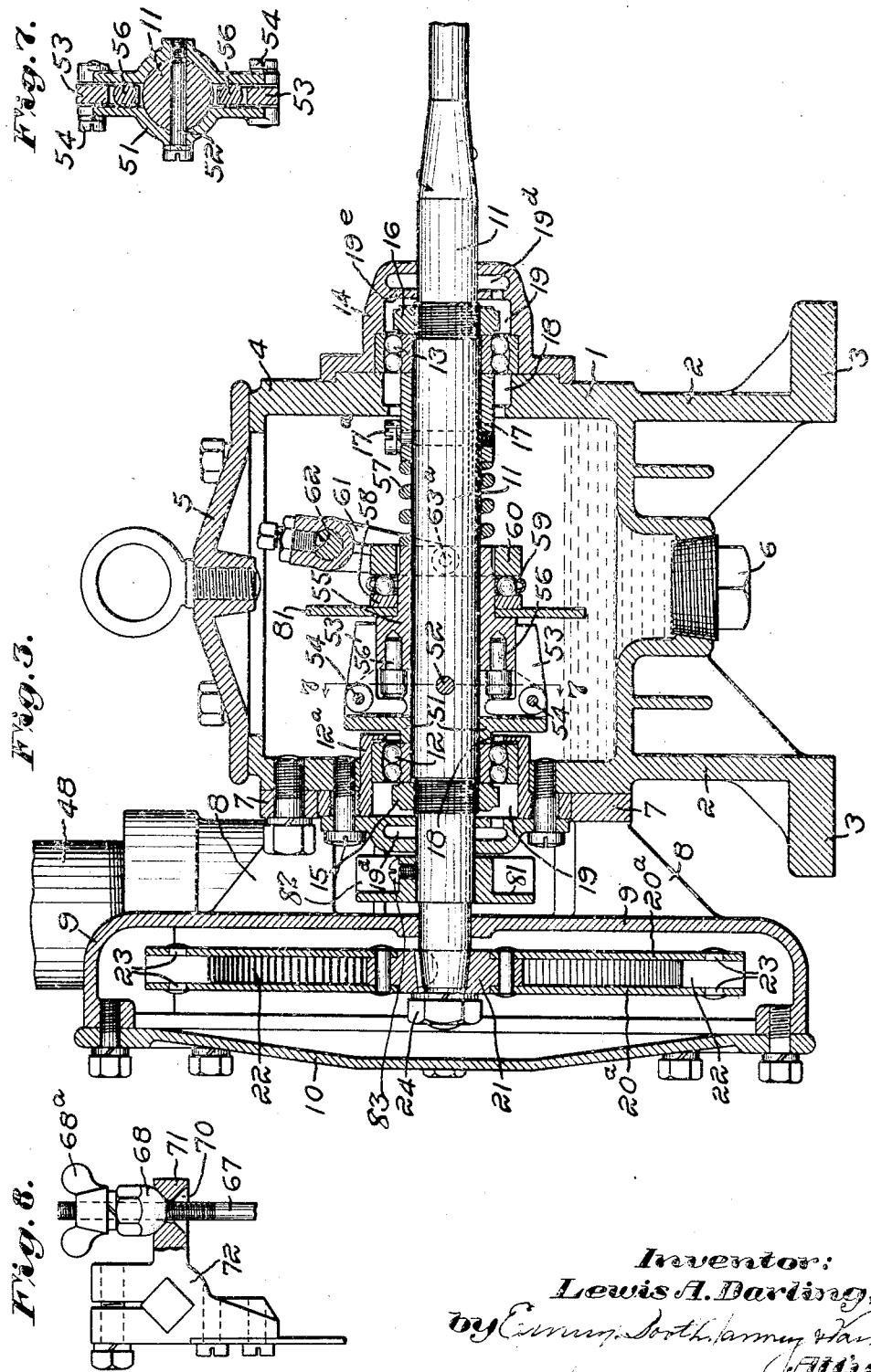

UNITED STATES PATENT OFFICE.

LEWIS A. DARLING, OF BOSTON, MASSACHUSETTS, ASSIGNOR TO ELECTRIC SERVICE SUPPLIES COMPANY, OF PHILADELPHIA, PENNSYLVANIA, A CORPORATION OF PENNSYLVANIA.

POWER-GENERATOR.

1,311,878.      Specification of Letters Patent.      Patented Aug. 5, 1919.

Application filed June 24, 1916. Serial No. 105,661.

*To all whom it may concern:*

Be it known that I, LEWIS A. DARLING, a citizen of the United States, and a resident of Boston, county of Suffolk, and Commonwealth of Massachusetts, have invented an Improvement in Power-Generators, of which the following description, in connection with the accompanying drawings, is a specification, like characters on the drawings representing like parts.

My invention relates to power generators, and particularly to generators of the turbine type. Its object is to provide a novel and improved generator comprising, among other features, improved fluid feeding means, speed governing means and oiling means. A generator of this type is particularly adapted for use in cases where sustained uniformity of speed and voltage and means for insuring the same are of great importance, as in the case of electric headlights for locomotives, and the present embodiment of my invention is a generator of that type.

This invention will be best understood by reference to the drawings of the illustrative embodiment thereof in connection with a description of the same, and in the drawings—

Figure 1 is a side elevation, partly broken away;

Fig. 2, a vertical cross-section on the line 2—2, Fig. 1;

Fig. 3, a vertical longitudinal section on the line 3—3, Fig. 2;

Fig. 4, a sectional detail on an enlarged scale, on the line 4—4, Fig. 2, from the left;

Fig. 5, a diagrammatical sectional detail, on the line 5—5, Fig. 4, from the right;

Fig. 6, an enlarged detail on the line 6—6, Fig. 1, from the right;

Fig. 7, a sectional detail on the line 7—7, Fig. 3; and

Fig. 8, a detail of a modified form of construction of the parts shown in Fig. 6.

The present embodiment of my invention comprises, Fig. 1, a substantially cylindrical barrel or case 1, having a depending supporting web 2 at each end, provided with a supporting flange or foot 3.

This case 1, Fig. 1, has an opening in its top within a curvilinear, upwardly extended flange 4, with a cover 5 therefor, providing ready means of access to the interior; it has also an oil drain plug 6 at the bottom. At its rear, Fig. 1, left-hand end, the case has secured thereto, as by screws, an end plate 7. This plate has a plurality of laterally extended webs 8, carrying at their outer ends a cylindrical turbine case or housing 9, with a suitable cover 10, which may be secured thereto in any convenient manner, as by screws.

Extended through the case 1, Fig. 3, is a main power shaft 11, having ball bearings 12, 13, at the opposite ends of the case. The bearing 12 is supported in a sleeve member 12ª in the front end wall of the case 1; and the bearing 13 is supported in a cap member 14 secured, Fig. 3, to the right-hand or forward end of the case 1.

These bearings are retained against longitudinal movement outward on the shaft 11 by locking nuts 15, 16, respectively, threaded on the shaft. The bearing 13 may be retained against longitudinal movement in the opposite direction by any convenient means as a sleeve 17 locked to the shaft, as by a screw 17ª, or the shaft 11 may be enlarged at this point in lieu of the sleeve, if desired.

One advantage of constructing the case 1 in the form of a hollow member or barrel is that it not only affords a strong, compact construction for the operating parts, to be described, but also it offers a convenient structure for embodying therein my improved oiling means, the oiling feature being an important one in the construction of all high speed generators. The case 1, Fig. 3, is here used as an oil reservoir, and the oil obviously has ready access to the bearing 12, and to the bearing 13, by means of channels 18 through the walls of the case 1 and the sleeve 12ª respectively.

The reservoir is supplied with oil by means of the opening 17ᵇ in the casing, Figs. 1, 2, which has a plug 17ᶜ. This opening is preferably so located that when replenishing the oil supply therethrough, it will prevent the oil level rising above the point at which it has been found the best results are obtained. My improved oiling means will be described in full presently.

While stuffing boxes may be used if desired for the bearings of the shaft 11, I have found that oil chambers effectively take care of all leakage of this kind, and provide necessary protection for the bearings 12, 13, against the entrance of dirt, etc. Accordingly, I have provided chambers 19, one at each end of the case 1, for this purpose. Oil that leaks through the bearings 12, 13, and is thrown off by the nuts 15, 16, is caught and retained by these chambers at the bottom thereof.

It will be obvious that oil collected in these chambers 19 will, if it reaches the height of the channel 18, run into the reservoir or case 1, and will never rise any higher (in the chamber 19) than the openings to said channels.

Adjacent the chamber 19, at each end of the case 1, is a second chamber 19$^d$ which serves to collect any oil that may work past the web 19$^e$, said chamber communicating at its bottom with the chamber 19.

As already stated, the housing 9, Fig. 3, for the turbine is carried by webs 8 from the end plate 7, and the rear wall of this housing is apertured to receive the end of the shaft 11. At its opposite side, Fig. 1, the casing 1 carries a suitable generator 19$^a$ in a housing or frame 19$^b$ connected with the headlight 19$^c$ suitably supported. The turbine wheel may be of any desired form of construction, and herein comprises two parallel side members or disks 20$^a$, conveniently secured to a hub 21.

These disks are provided, Figs. 3, 5, near their edges, with a series of curved vanes or blades 22, extended from one disk to the other, the pockets between them opening into the central space between the two disks. The blades may be secured to the disks in any suitable manner. In this case I have, Fig. 3, extended posts 23 on the ends of the blades through the disks and headed them over. The turbine is retained on the shaft 11 by a nut 24.

While any suitable medium, as air or liquid, may be used as a propelling agent, obviously for use on a steam locomotive, as for a headlight, steam offers many advantages, and the embodiment of my invention described herein is adapted to be operated by steam from the locomotive.

For feeding the steam and controlling the action thereof, I have provided novel and particularly effective means, wherein some elements of the feeding means constitute also elements of the controlling means. The feeding and controlling means is designed to present to the varying pressure of the steam supply at all times substantially an equal surface area of the feeding means. The purpose of this construction is to insure that the varying steam pressure from the locomotive shall not affect the action of the feeding means as part of the governing and controlling means for the control of a necessary supply of steam to the turbine wheel, to maintain proper speed of the turbine.

The housing 9, Fig. 2, is provided with a neck 25 on its edge and near the top, having a passage 26 therethrough, and by means of which the propelling medium may be supplied to the turbine wheel chamber and wheel 20. Within this neck, Fig. 4, the passage 26 extends laterally to the right across the housing to the rear thereof through a wall 27, communicating with a vertical passage 28 in a boss 29 extended laterally from the case 1. The passage 26 contains a strainer 30, which may be a tubular member, threaded to engage the wall 27 and boss 29, and provided on its outer end with a head for convenient insertion and removal thereof as by a wrench.

This strainer 30 may be provided with a plurality of apertures 31 in the side thereof to permit free passage of steam in all directions, and it may carry a sheet of any suitable straining material, as fine wire cloth 32, on its inner face. The wall of the strainer 30 will serve to prevent distortion of the wire cloth 32 from any cause.

The passage 28 leads downwardly from the strainer 30 into a longitudinal nozzle shaft passage 33 extended across the boss 29 to the interior of the housing 9 and the turbine chamber 33$^a$. In this passage 33, for convenience, I insert a bushing 34, threaded to engage the wall 27 and the boss 29, and provided with a series of circumferentially arranged openings or steam inlets 35. These inlets communicate with a counterbored section of the bushing 34 to form, in effect, a circular steam chamber 35$^a$.

For feeding the propelling medium to the nozzle any desired and suitable means may be provided. I prefer, however, to employ a novel construction comprising a hollow nozzle carrying and feeding shaft 36, provided with a longitudinal nozzle feeding passage 37, and passages 38 leading from the same to the chamber 35$^a$. The shaft has a nozzle 39, secured to its left-hand end (Fig. 4) and is a part of my novel speed controlling and governing means.

Inasmuch as the shaft 36 is a part of the speed controlling means, it is of course desirable that the movement of this shaft, while performing its function as a part of the speed controlling means, shall not subject it to carrying degrees of steam pressure or to varying friction of any kind. It is also desirable that any variation in steam supply shall not affect its function as a part of the speed controlling means, but that it shall be free at all time to perform both functions in any position, and under any boiler pressure.

It will be noted that with the construction described, the steam or other fluid is fed to the passage 37 from the chamber 35ª around the shaft 36 by the passages 38 under equal pressure. Therefore the shaft 36 may be termed "balanced" as to the steam pressure thereagainst.

While it is preferable to proportion the size of the steam passage 37 in the nozzle shaft 36, and if necessary, the steam passages 35—35ª leading thereto, to the approximate steam pressure regularly carried in a particular installation, so that the full load, as voltage to the headlight, for instance may be carried at such pressure, this is not necessary.

In order that the generator may be used conveniently also in cases where the conditions are for some reason likely to be changed and where it may be desired to carry the full load at less than the full steam pressure, passages for steam may be proportioned to the full load, to perform the full service, at a minimum pressure, say 150 pounds.

A suitable passage such, for instance as the passage 38ª, see Fig. 2 dotted lines, may be provided leading from the outside of the boss 29 to the passage 28, and into this passage a sleeve 38ᵇ, Fig. 4, may be inserted and provided with ports 38ᶜ.

A steam cock 38ᵈ of suitable length, Fig. 2, may then be threaded into the sleeve 38ᵇ so that by turning the cock in or out, the ports 38ᶜ may be closed or opened to the desired extent. Then if steam is normally carried at say 150 pounds pressure, and it is desired to increase this pressure to 250 pounds, it will be possible to carry the full load at the original pressure of 150 pounds under the changed conditions, by closing the ports 38ᶜ sufficiently to permit only 150 pounds pressure to be supplied to the nozzle shaft 36. While permitting operation of the generator under changed conditions, as pointed out, this construction also makes possible the practice of considerable economy in the use of steam under the changed conditions.

The shaft 36 extended from the low pressure turbine chamber 33ª to the atmosphere at its opposite end, presents to a substantially low and equal pressure, a shaft end in each case of substantially equal sectional area, so that, with respect to the effect on the shaft of the high pressure supply steam, the shaft is balanced against longitudinal movement, and consequently there can be no movement of the nozzle thereon laterally, and consequently no lateral friction to affect control.

I am aware that it has been common to feed a liquid to a turbine wheel by means of an adjustable, flexible pipe or nozzle. However, whenever a flexible nozzle is used for feeding the propelling medium, it always, with age, becomes stiff and more difficult thereafter of the nice adjustment necessary for satisfactory use in connection with turbines.

On the other hand, if a throttling valve is used, it is constantly subjected to the serious wear necessarily imposed on it by attrition by the extremely high velocity at which the gas, air or water is fed through it. This attrition soon wears away the surface of the valve parts, particularly in the case of a small turbine, and, as they wear, the quantity of the actuating medium which is normally fed through the valve changes, and this seriously affects the speed of the turbine and increases the difficulty of controlling its speed.

To avoid these difficulties, I prefer, as stated, to employ a rigid fluid feeding member, as a nozzle 39 (Figs. 4, 5) secured to the reduced end 40 of the shaft 36, as by a screw 41, and from which shaft the propelling medium is fed to the nozzle, through lateral apertures 42 and a longitudinal aperture 43. The nozzle depends (Fig. 5) in close proximity to the turbine wheel 20. By means of this construction, I avoid the difficulties mentioned attributable to the use of throttling valves and flexible nozzle connections.

If it is desired to provide a suitable lateral stop for the nozzle 39 to prevent lateral motion thereof, a pin 44 may be extended from the side wall of the housing 9 against the nozzle, the latter normally resting thereagainst without regard to the pressure of the contained pressure medium, but this is unnecessary.

A longitudinal passage 45 through the nozzle is contracted at its inner end to form a throat 46 which gradually increases in diameter toward the outer end of the nozzle to provide more space for the propelling medium as its pressure is decreased. The nozzle 39 is beveled on its side 47 adjacent the turbine wheel to permit close positioning of it relative to the blades 22.

Obviously, when the rotatable shaft 36 is turned to throw the nozzle 39 close to the blades, (see Fig. 5) full line position, they will receive substantially the full driving effect of the fluid. When the shaft is turned to throw the nozzle more or less away from the blades, dotted line position, (Fig. 5), they will receive less driving effect than before, and rotate more slowly. In any event, the wear on the nozzle is infinitesimal as its opening is not restricted by any throttling member to increase the frictional wearing effect of the discharged medium. From the opposite side of the housing 9, an exhaust pipe 48 leads to the atmosphere.

In place of stuffing boxes for the shaft 36,

I prefer to use air chambers 49, 50, the chamber 49 being connected by a passage 49ª with the wheel chamber 33ª. Any steam that may escape past the web 49ᵇ will be collected in the chamber 50 where it will be condensed. I have found that these chambers so effectually take up the leakage from the bearing about the shaft 36 that little, if any, escapes. While stuffing boxes may be used, nevertheless the danger, if used, is that at different times the nuts will be set up to a different degree and thus create varying degrees of pressure about the surface of the shaft.

This condition would interfere with the normal rotation and action of the shaft, as part of the speed governing and controlling means of which it is one element, as will more clearly appear presently; and for that reason I prefer to dispense with stuffing boxes. In the present construction the shaft is subjected to equal lateral pressure at all times.

An important feature in the construction of any machine for use under conditions where regularity of speed and voltage is of prime importance, is the governing means for insuring such regularity. Particularly is this so in the case of a machine adapted for use in connection with a headlight on a locomotive where fluctuation in the voltage is a serious defect because, as stated, the life of the lamp is materially shortened thereby and besides increasing the expense of maintenance its reliability is impaired.

To insure the required evenness of speed and voltage, I have, in this case, conceived a novel construction which, while embodying the principle of the fly ball governor, possesses a novel means for applying this principle to the control of the turbine actuating medium.

Referring again to Fig. 3, I provide the shaft 11 with a collar 51 which may be secured thereon as by a pin 52. The collar 51 is recessed at a plurality of points on its face to receive governor weights herein shown also as nozzle-positioning bell-crank levers 53, pivotally secured therein as by pins 54, the longitudinal arm of the weights or levers preferably being the longest.

Adjacent the collar 51, (Fig. 3) is a movable nozzle positioning or governing sleeve 55 of suitable thickness and drilled at one end to receive therein a plurality of lever-engaging pins 56, with enlarged heads. These pins are positioned opposite and are adapted to be engaged by the short arms of levers 53.

On the shaft 11 and between one end of this sleeve 55 and adjacent sleeve 17, is a weight opposing coiled spring 57 seated against opposed ends of said sleeves. This spring acts normally to press the sleeve 55 toward the rear of the machine, as shown in Fig. 3, and tends, with the nozzle positioning and governing means, to be presently described, to allow the nozzle 39 to take a position to deliver steam directly adjacent the blades 22 of the turbine wheel 20, as in Fig. 5, full line position.

The sleeve 55 is reduced at one end, and carries thereon one ring 58 of a ball bearing, and ball race 59 thereof, constituting, together with a coöperating pivotally supported ring 60, a nozzle-positioning and governing yoke-engaging member.

This ring 60 (Figs. 2, 3) is supported by a nozzle positioning and governing yoke 61, carried in turn by a yoke shaft 62 pivotally mounted in bushings 63, 63, threaded into the opposite side walls of the case 1. The ring 60 is pivotally supported between the arms of the yoke 61 (Fig. 2) by screw pins 63ª. For effecting the control of the nozzle 39 by means of the governor weights 53, spring 57 and yoke 61, I have devised a novel and particularly effective construction which I will now describe.

The shaft 62 carries upon one end, which, in Fig. 2, is at the left-hand, a crank 64, one end of which is split and secured to the squared end of the shaft 62 by means of a locking screw 65. The opposite end of the crank 64 is apertured and (Fig. 6) is engaged by a hook 66, on the lower end of a link 67, carrying at its upper end a curvilinear head 68.

The head 68 is preferably received by an adjustable socket-like member 69 herein (Fig. 6) shown as a bushing, the passage 70 therethrough being flared at one end, to permit ready insertion and removal of the head 68, and at its opposite end freedom of movement of the link 67.

This bushing 69 is threaded into and therefore adjustably secured to one arm 71 of a three-arm lever 72 secured to the squared end of the nozzle shaft 36. The lever 72 may be secured to the shaft 36 in any desired and suitable manner, as for instance, by splitting the end of the lever arm and locking it on the shaft 36 by a screw 73; and the bushing 69 may be satisfactorily locked in adjusted position in the end of lever 72 by a similar screw 74.

In Fig. 8 I have shown a modified form of construction wherein the head 68 movable on the end of link 67 is seated in a similar flared end of the passage 70, in the lever arm 71 itself. In this case the head 68 is adjusted relative to the arm 71 by moving it on the link 67 and locking it in position, as by a winged nut 68ª.

By the foregoing means it will be clear that a most delicate adjustment of the connections between the governor weights 53 and the fluid feeding member, herein the nozzle shaft 36, is effected and such that the shaft 36 will respond instantly to any movement of the ring 60 effected by the joint and coöperating action of the governor weights 53 and spring 57.

It will be obvious that when the actuating fluid for the turbine is supplied through the pipe in neck 25, it will flow through passage 26, strainer 30 to passage 28, thence to openings 35 about the nozzle shaft 36, through apertures 38 to nozzle passage 37 in shaft 36. From the passage 37 it is delivered by means of side openings 42 and end opening 43 to the passage 45 in the nozzle 39, as stated.

The position of the shaft 36 controls the position of the nozzle relative to the turbine wheel, as rotation of the shaft 36 will move the nozzle 39 toward and away from the blades 22 and therefore vary the quantity of propelling medium delivered thereto. As the speed of the generator increases, the lever arms 53 tend to fly outward but are restrained by the pins 56, collar 55, and they in turn are restrained by the spring 57.

This spring is preferably of such tension that it will not yield until the speed of the main shaft is approximately but not quite up to that at which it is desired that the shaft be run in order to run the electric generator at the desired speed. When it yields, it permits the collar 55, ball bearing members 58, 59, to slide longitudinally on the shaft 11, and thus swing the ring 60 in the same direction. This swinging of the ring 60 also acts through its connection with the yoke arms 61, 61, to turn yoke shaft 62, acting in turn through the crank 64, its connections with the fluid feeding member, herein its link 67 and lever 72 to turn the nozzle shaft 36 and nozzle 39 with relation to the turbine wheel 20. This action determines the quantity of propelling medium that will be impelled against the blades 22 of the wheel 20 and thereby determine the speed of the shaft 11 and in this case, generator 19$^a$ and voltage of the lamp 19$^f$.

While the foregoing construction will provide very complete and accurate control and adjustment of the nozzle relative to the turbine wheel 20 and hence will control the speed of the generator, I have provided an additional adjusting member 75 for still more accurately adjusting and controlling the speed of the generator, and also for returning the nozzle to its initial position.

This additional or supplementary speed controlling means for obtaining still finer adjustment and more complete control comprises a second spring member 75, herein a leaf spring (Figs. 2, 6) one end of which is secured to the arm 76 of the lever 72. Its opposite and lower end is adjustably engaged by the head 77 of the link 78 pivotally secured to the adjustable screw 79 threaded into the casing 1, and locked in position by the nut 80. It is, of course, obvious that by means of this spring 75 and its adjustable connections, an additional pressure may be imposed upon the lower arm 76 of the lever 72 and shaft 36, and acting to restrain the lever and shaft 36 against rotation by the arm 64 also to a most accurately gaged degree. Therefore, the spring 57 is adjusted to give approximately the compression necessary to yield at a speed somewhat below that required of shaft 11, and through connections already described, actuate the shaft 36. The spring 75, is also adjusted to a still finer degree and will by its tension still more accurately determine the time and extent of actuation of shaft 36 and thereby provide a most complete control of the shaft and nozzle 39 carried thereby with a corresponding resulting uniformity of speed. This additional adjusting spring 75 also co-acts with the governor spring 57 to take up all lost motion in the speed controlling mechanism and thus acts to assist in maintaining the proper speed and provide proper voltage for the lamp.

This construction is remarkably simple in operation, requiring but little attention when once installed, and is compact and strong to withstand the hard usage to which it is necessarily subjected.

For properly oiling the several parts, I have conceived a novel construction. It is, of course, very desirable that the oiling system be one that will require a minimum of attention and possess a maximum of efficiency. As already stated, I use the casing 1 as an oil reservoir and am thereby enabled to carry a liberal supply.

For feeding the oil in the required small quantity to the several parts without causing it to foam, I have provided an oil feeding disk 81 which is carried by the sleeve 55 on the shaft 11. This disk is polished and runs in the oil in the bottom of the reservoir without splashing it to any material extent.

The disk, however, carries up with it at each revolution a sufficient quantity of oil which creeps along and over the several adjacent members, including the ball bearings, lubricating them perfectly for a long period. This is accomplished without a violent splashing of the oil which results in so extensive a leakage of the same about the bearings, and which splashing is so often the result of other forms of construction. The foregoing has proven to be a very efficient, economical and automatic oil system.

From the foregoing description, it will be seen that the governor casing 4, and the turbine and generator housings 9, and 19$^b$, form a compact, convenient unitary shell structure inclosing all the main revolving elements of the power generator set,—i. e., the turbine wheel or rotor 20, the rotating generator structure 19$^a$, and the governor with its weights 53, etc. The central governor casing portion 4, of this inclosing shell not only contains the shaft bearings and serves as an oil chamber or pocket for their lubrication,—as well as for the lubrication of the governor itself,—but it also forms the fixed point of attachment in the mounting of the whole power generator set on the locomotive. The supporting feet 3, by means of which the set is mounted, being on this central casing 4, it is an easy matter to detach and remove the turbine and generator housings 9, and 19ª, without dismounting the whole set.

The central casing 4, being entirely closed off from the turbine housing 9, the steam in the turbine chamber has no opportunity of evaporating the lubricant therein. As shown, indeed, the central casing 4, is not only closed off from the turbine housing 9, (to which it is attached by the webs 8), but is in a manner external to and separate therefrom, and there is between them an intervening air space (see Figs. 1, and 3), that prevents leakage of steam along the shaft 11, into the casing 4. For dissipating such fluid as may escape from the housing 9, through the necessary clearance in its end wall around the shaft 11, and so preventing its heat from being communicated to the oil in the governor casing 4, there is mounted on the shaft 11, (between the housing and the casing), baffle means shown as in the form of a disk 81, with fan blades 82, at one side thereof. This fan device is secured to turn with the shaft 11, by means of a set-screw 83.

The bearings 12, and 13, at opposite ends of the casing 4, are open and exposed toward its interior, so that their automatic lubrication, (as well as that of the governor), is assured by the distribution of oil throughout the casing in a finely divided state by means of the disk 55, associated with the governor on the shaft 11, between them. Escape of oil from the casing 4, is effectually prevented by means of the chambers 19, and 19ᵈ, in the bearing members 12ª, and 14. Distribution of oil to the bearings is also effected by the revolving nuts 15, and 16.

Movement of the sliding and rotating sleeve 55, lengthwise of the shaft 11, by means of the centrifugally operating governor weights, is opposed by the resilient spring member 57, on said shaft, which thus constitutes a sort of fixed governor load. Ordinary speed regulation or adjustment of the machine is taken care of by means of the spring 75, connected between the governor casing 4, and the turning member or nozzle shaft 36, projecting from the adjacent side of the turbine housing 9, parallel to the main shaft 11, and conveniently accessible from outside the casing. The linkage 67, etc., (interconnecting the fluid control member 36, and the governor actuated turning member 62, projecting from the casing 4, at right angles to the shaft 11), provides for further adjustment.

The supply of energy to the turbine or rotor 20, in the form of motive fluid is controlled by means of the fluid feeding nozzle member 39, pivoted in the turbine chamber so as to swing toward and away from it,— the movement of this nozzle controlling the amount of fluid actually directed or presented to the turbine and hence its action on the turbine. Motive fluid from the inlet chamber 26, formed in the housing walls adjacent the turbine chamber is conveyed to the nozzle 39, through its pivotal axis member 36, by means of the supplemental chamber 28, adjacent the turbine and inlet chambers, and communicating with the latter: the pivotal member 36, it will be seen, opens into the supplemental chamber and extends therefrom into the turbine chamber.

In all past attempts to use generators for electric headlights for locomotives, a serious obstacle has been the inability to produce a generator capable of furnishing power in a substantially correct quantity under the peculiarly trying conditions imposed in service of this kind. A second obstacle, has been the inability to insure a steady and unvarying speed so that when driving an electric generator which furnishes current for lighting, for instance, the voltage will remain substantially constant, because a variable voltage seriously shortens the life of the lamp.

The foregoing difficulties have been largely responsible for the failure by railroads to generally adopt electric headlights for use. A generator for use in connection with a locomotive headlight, moreover, must be of compact and strong design, comprising a minimum of easily assembled parts which are economical to manufacture.

I am able by the foregoing construction to obtain a uniformity of speed, and in the present case, a uniformity in voltage, resulting in uniformity of lighting capacity and longevity of the lamp hitherto unattainable.

It will be clear that many details of construction may be varied without departing from the spirit of my invention and scope of the accompanying claims.

Claims:

1. A power generator comprising a turbine wheel, a shaft therefor, a fluid feeding nozzle, and speed regulating and fluid feeding means comprising governor weights on the shaft, a rotatable fluid feeding nozzle shaft; and means connecting the weights and nozzle shaft for controlling by the wheel shaft the position of the nozzle shaft and nozzle and the feeding of fluid to the wheel.

2. A power generator comprising a turbine wheel, a shaft therefor, a fluid feeding nozzle, and speed regulating and fluid feeding means comprising governor weights on the shaft, a rotatable fluid feeding nozzle shaft; and means including a weight opposing spring connecting the weights and nozzle shaft for controlling by the wheel shaft the position of the nozzle shaft and nozzle and the feeding of fluid to the wheel.

3. A power generator comprising a turbine wheel, a shaft therefor, a fluid feeding nozzle, and speed regulating and fluid feeding means comprising governor weights on the shaft, a rotatable fluid feeding nozzle shaft; and means including a weight opposing spring, and a nozzle positioning spring connecting the weights and nozzle shaft for controlling by the wheel shaft, the position of the nozzle shaft and nozzle and the feeding of the fluid to the wheel.

4. A power generator comprising a turbine wheel, a shaft therefor, a fluid feeding nozzle, and speed regulating and fluid feeding means comprising governor weights on the shaft, a rotatable fluid feeding nozzle shaft, and means including a cumulative acting weight opposing spring and a nozzle positioning spring connecting the weights and nozzle shaft for controlling the position of the nozzle and the feeding of fluid to the wheel.

5. A power generator comprising a turbine wheel and a fluid feeding nozzle, and speed controlling and fluid feeding means comprising the turbine shaft, governor weights thereon, a governor weight sleeve actuated thereby, an opposing resilient member for the sleeve, a nozzle positioning yoke operatively connected with the sleeve; a yoke crank, a nozzle shaft yoke, a nozzle shaft lever connecting the crank and nozzle shaft, and cumulative spring members controlling the nozzle shaft and fluid feeding.

6. A power generator comprising a case, a shaft, a turbine wheel thereon and speed regulating and fluid feeding means comprising a fluid feeding nozzle, a shaft for said nozzle, governor weights on the turbine shaft, and means including a weight opposing spring connecting the shafts and controlling the movement of the nozzle relatively to the wheel by the turbine shaft.

7. A power generator comprising a case, a shaft, a turbine wheel thereon, and speed regulating and fluid feeding means comprising a fluid feeding nozzle, a shaft for said nozzle, governor weights on the turbine shaft, and means including a plurality of cumulative acting, unassociated springs connecting the shafts and controlling the movement of the nozzle relatively to the wheel.

8. A power generator comprising a case, a shaft, a turbine wheel thereon, and speed regulating and fluid feeding means comprising a fluid feeding nozzle, a shaft for said nozzle, governor weights on the turbine shaft, and means including a weight opposing spring and a nozzle positioning spring, connecting the shafts and controlling the movement of the nozzle relatively to the wheel.

9. A power generator comprising a case, a shaft, a turbine wheel thereon, and speed regulating and fluid feeding means comprising a fluid feeding nozzle, shaft therefor, governor weights on the turbine shaft, and means, including a weight actuated sliding sleeve, an opposing spring therefor, and means connecting the sleeve with the nozzle shaft, connecting the shafts and controlling the position of the nozzle.

10. A power generator comprising a case, a shaft, a turbine wheel thereon and speed regulating and fluid feeding means comprising a fluid feeding nozzle shaft, governor weights on the turbine shaft, and means. including a weight actuated sliding sleeve, an opposing spring therefor, a rocking yoke, and a crank connecting the yoke with the nozzle shaft, connecting the shafts and controlling the position of the nozzle.

11. A power generator comprising a case, a shaft, a turbine wheel thereon and speed regulating and fluid feeding means comprising a fluid feeding nozzle shaft, governor weights on the turbine shaft, and means, including a weight actuated sliding sleeve, an opposing spring therefor, a rocking yoke, a crank connecting the yoke with the nozzle shaft, and a nozzle shaft positioning spring, connecting the shafts and controlling the position of the nozzle.

12. A power generator comprising a case, a shaft, a turbine wheel thereon and speed regulating and fluid feeding means comprising a fluid feeding nozzle shaft, governor weights on the turbine shaft, and means, including a weight actuated sliding sleeve, an opposing spring therefor, a rocking yoke, a crank connecting the yoke with the nozzle shaft, a nozzle shaft positioning spring and an oil feeding disk on the turbine shaft, connecting the shafts and controlling the position of the nozzle.

13. A power generator comprising, as a unitary structure, a governor casing with bearings, a generator housing and a turbine housing attached to said casing at opposite ends thereof, said governor casing being entirely closed off from the turbine housing, and a shaft in said bearings extending into both of said housings and carrying revolving governor and turbine elements.

14. A power generator in accordance with claim 13, in which the governor casing is provided with supporting means, so as to form the fixed point of attachment in the mounting of the generator, and the generator and turbine housings are detachable therefrom.

15. In a power generator, a turbine housing, a generator housing, an interposed central casing entirely closed off from the turbine housing and affording a fluid reservoir, a shaft therethrough, a governor thereon within the casing, and means for automatic lubrication within said central casing, operated by rotation of the shaft.

16. In a turbine generator set, an inclosing shell, a generator, a turbine and a governor inclosed within said shell, a central portion in said shell containing bearings, a shaft extending through said shell and carrying a governor in said central portion, means whereby the governor action controls the speed of the machine, and means within said central portion of said shell whereby governor and bearings are automatically oiled.

17. The combination of a casing with bearings, an adjacent turbine housing, a shaft in said bearings extending into said housing and carrying a turbine, means for controlling the supply of motive fluid to the turbine including a turning member projecting from the side of the turbine housing adjacent the casing parallel to the shaft, and means for regulating the action of said fluid control means connected between its turning member aforesaid and the adjacent casing.

18. The combination of a governor casing with bearings, an adjacent turbine housing, a shaft in said bearings extending into said housing and carrying a governor and a turbine, means for controlling the supply of motive fluid to the turbine including a member projecting from the side of the turbine housing adjacent the governor casing parallel to the shaft, a governor-actuated turning member projecting from the casing at right angles to the shaft, and means operatively interconnecting said fluid control and governor-actuated members.

19. In a turbine, a casing including an oil chamber and a turbine housing at one end thereof but external to and separate therefrom, a shaft extending through the casing and into the housing, means for controlling the supply of energy to the wheel, a governor mounted on the turbine shaft within the casing, linkage between said governor and said means of controlling the energy supply to the wheel, and means within the casing for automatic lubrication of the governor.

20. In a power generator, a casing adapted to contain a supply of oil, housings for a turbine and a generator at its ends, a shaft extending through said casing into said housings, bearings for said shaft exposed to the interior of the casing, and means on said shaft within the casing for distributing the oil to said bearings, a governor mounted on the shaft within said casing, and means also in said casing for distributing oil to the governor.

21. In a power generator, a casing, a turbine housing at one end thereof, a shaft extending through the casing and into the housing, a governor for the turbine in the casing, means for automatically oiling the governor, bearings mounted at the end of the casing and means for automatically oiling the bearings, and means accessible from outside the casing for adjusting the speed of the machine.

22. A power generator comprising a wheel housing, a governor and bearing casing and bearings associated therewith, a shaft therein, a turbine wheel thereon, a fluid feeding member for the wheel, and speed regulating means comprising governor weights on the shaft, a resilient member on the shaft opposing the movement of the governor weights in one direction, and means connecting said governor weights and the fluid feeding member for controlling the amount of fluid presented to the turbine wheel, and means within the governor and bearing casing for automatic lubrication.

23. In a turbine, a wheel housing a wheel therein, a governor casing entirely closed off from the turbine housing and affording a fluid reservoir, a shaft in the housing and casing, a sleeve in the governor casing slidable on said shaft and turning therewith, centrifugally operated means for moving said sleeve longitudinally on the shaft, a nozzle shaft mounted on the wheel housing, means whereby the governor sleeve controls the nozzle shaft and regulates the speed of the turbine, an oil supply in said governor casing, and means for automatic oiling within said casing.

24. In a power generator, a central casing, a shaft extending therethrough and projecting therebeyond and having mounted thereon at one end a turbine wheel or rotor, a housing for said wheel, bearing members for the shaft mounted at the ends of said central casing, a governor on the shaft between said bearings, an oil pocket in said central housing and means on the shaft for automatically oiling said bearings.

25. The combination of a turbine housing, a casing forming a reservoir for lubricant attached thereto but separated therefrom by an intervening air space, a shaft in said casing extending into said turbine housing and carrying revolving governor and turbine elements, and a bearing for said shaft in the end wall of said casing open to its interior for lubrication by the lubricant therein.

26. An elastic fluid turbine comprising a turbine housing, an oil-containing casing, a shaft through the casing extending through an opening with a clearance into the housing, and means on the shaft between the housing and casing to dissipate fluid escaping from the housing through the clearance around said shaft.

27. In a turbine, a casing, bearing members on its ends open toward the casing, means on shaft for distributing oil to the bearing members, and means for preventing oil from escaping from the casing, a turbine housing, a baffle on the shaft between the housing and central casing.

28. An elastic fluid turbine comprising a housing, a shaft extending into said housing with a clearance, a turbine wheel on said shaft in said housing, a central casing, bearings at the end of said casing, and exposed from within, a governor on said shaft within said casing, a disk or fan on said shaft between said housing and casing, and means for automatically oiling shaft bearings and governor.

29. In an elastic fluid turbine, the combination of means forming a motive fluid inlet chamber adjacent the turbine chamber, a nozzle for directing motive fluid to the turbine pivoted to swing toward and away from it to control the action of the motive fluid, and means for conveying motive fluid from said inlet chamber to said nozzle through the pivotal axis.

30. In an elastic fluid turbine, the combination of means forming a motive fluid inlet chamber adjacent the turbine chamber, means forming adjacent the turbine and inlet chambers, a supplemental chamber communicating with the latter, and a hollow axis member opening into the supplemental chamber and extending therefrom into the turbine chamber, and provided with a discharge nozzle in the turbine chamber.

In testimony whereof I have signed my name to this specification.

LEWIS A. DARLING.